United States Patent [19]
Abernathy et al.

[11] 3,803,598
[45] Apr. 9, 1974

[54] INVERSE RANGING AND DETECTING SYSTEM

[75] Inventors: James O. Abernathy, Cockeysville; Harold W. Jackson, Towson; Erik Rosenbaum, Randallstown; Thomas L. Gabriele, Timonium, all of Md.

[73] Assignee: The Bendix Corporation, Southfield, Mich.

[22] Filed: Sept. 21, 1971

[21] Appl. No.: 182,333

[52] U.S. Cl. ......... 343/5 SA, 340/3 R, 340/15.5 SC, 343/100 CL
[51] Int. Cl. .............................................. G01s 9/02
[58] Field of Search ......... 343/5 SA, 18 E, 100 CL; 340/3 R, 15.5 SC, 5 D

[56] References Cited
UNITED STATES PATENTS 3,614,719  10/1971  Treacy ..................... 343/5 SA UX
3,609,671  9/1971  Webster et al ................. 340/5 D X
3,461,451  8/1969  Gutleber ................. 343/100 CL UX
3,374,478  3/1968  Blau ....................... 343/100 CL UX Primary Examiner—Maynard R. Wilbur
Assistant Examiner—G. E. Montone
Attorney, Agent, or Firm—W. G. Christoforo; Bruce L. Lamb

[57] ABSTRACT

A ranging and detecting system such as radar, sonar or the like is arranged to transmit the signature of a desired target. A cross correlation process takes place as the transmitted wave front sweeps past the possible targets. Back-scattered energy is received by a unit having a single optimum bandwidth and a threshold which detects only the desired target.

11 Claims, 12 Drawing Figures

3,803,598

INVENTORS
JAMES O. ABERNATHY
HAROLD W. JACKSON
ERIK ROSENBAUM
THOMAS L. GABRIELE

BY *William G. Christoforo*
ATTORNEY

INVENTORS
JAMES O. ABERNATHY
HAROLD W. JACKSON
ERIK ROSENBAUM
THOMAS L. GABRIELE

BY *William G. Christoforo*
ATTORNEY

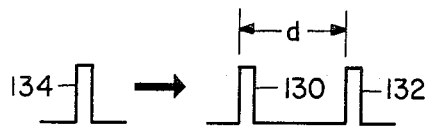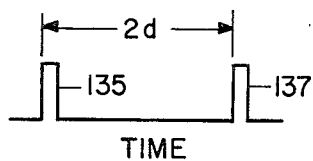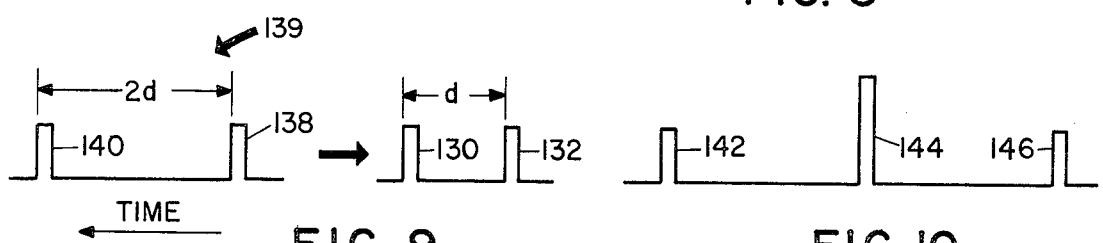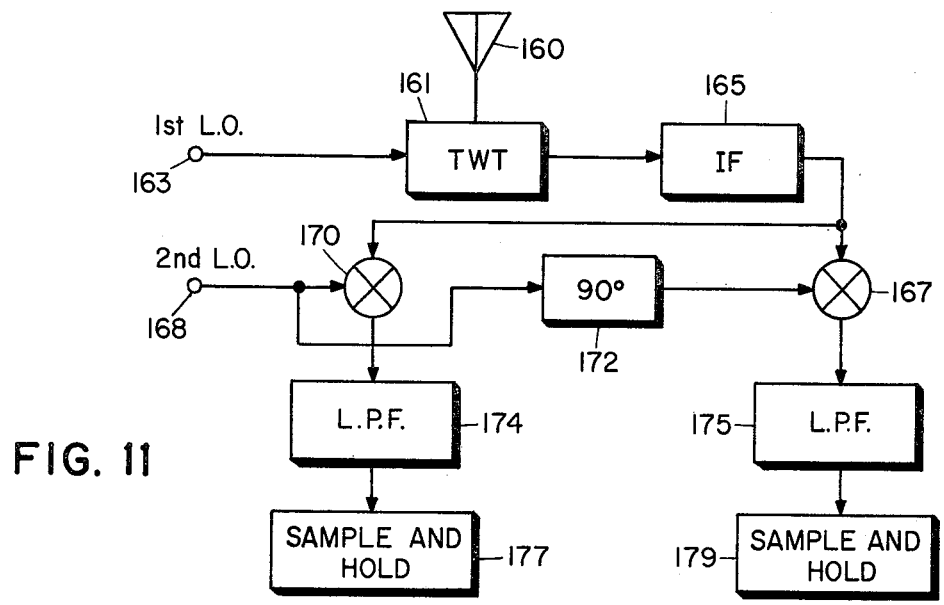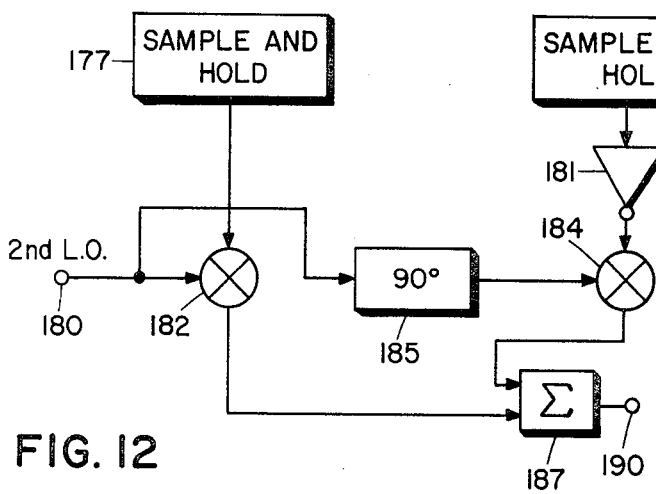
INVENTORS
JAMES O. ABERNATHY
HAROLD W. JACKSON
ERIK ROSENBAUM
THOMAS L. GABRIELE
BY *William G. Christoforo*
ATTORNEY

INVERSE RANGING AND DETECTING SYSTEM

BACKGROUND OF THE INVENTION

This invention relates to ranging and detecting systems such as radar, sonar and the like wherein a transmitted energy signal is back-scattered from a target or group of targets and the back-scattered energy incident upon a receiver is used to detect the target. Most of these systems transmit an energy pulse and attempt optimum processing of the return energies in a receiver filter. For detection and ranging, the filter is typically of the matched variety, where the filter's input response is made to be the time reverse of the transmitted wave shape. This system is optimum in the sense of sensitivity to target imbedded in white noise, but does little to help the target-in-clutter problem, nor does it provide much in the way of target identification.

Recent approaches to these latter problems have involved wider receiver bandwidths and shorter transmitted pulses. This helps by breaking the clutter up into its more elemental components and, in the case of identification, resolving significant features of the targets. In these approaches, the emphasis has been on simple transmitters and complicated return signal processors. This is satisfactory as long as the task is relatively simple. However, when the task becomes relatively more complex, such as when monopulse guidance is added to the requirement of target identification, with its attendant dual polarization receivers, the possibility of shifting some of the load to the transmitter becomes attractive.

SUMMARY OF THE INVENTION

One way in which some of the load of target recognition and detection can be transferred to the transmitter is for the transmitter to send out not a pulse but a waveform matched to the target being sought. For example, to perform a function equivalent to that performed by the matched filter described above, the transmitted waveform will be the time inverse of the signature of the signature of the target of interest, where the time inverse of a signal is the signal played backwards in time. This realizes a matched filter, since the back-scattered energy from the target is actually the convolution of the target signature with the transmitter's output waveform. This, of course, is the same process that takes place in a filter, since a filter's output is a convolution of its input signal with the filter's input response. Thus, it might be expected that the signal return from a desired target illuminated by the target-time-inverse signature looks like the output of a filter matched to that target. In addition, the returns from undesired targets will be spread-out but decorrelated, thus providing signal to clutter improvement.

More advanced pattern recognition devices use hyperplane techniques to determine the filter characteristics against which the target return will be compared in recognizing the target signature. These hyperplane techniques can also be used in this inverse ranging and detecting system for pattern recognition.

It is thus an object of this invention to provide a pattern recognition system.

It is another object of this invention to provide a pattern recognition system for ranging and detecting systems which operate in real time.

It is still a further object of this invention to provide a pattern recognizer of the type described, wherein convolution of a target with a signal waveform derived from the target signature is performed at the target.

It is another object of this invention to provide a target recognizer wherein the inverse target signature or an inverse signature modified by hyperplane techniques comprises the transmitted signal.

One more object of this invention is to provide a target recognizer of the type described which is useful in various ranging and detecting systems such as radar, sonar and the like systems.

This invention is in a relatively new portion of the field of pattern recognition. It is believed that certain of the terms used in this field and used in the subsequent description of the preferred embodiment and claims have not yet acquired a definite and well-known meaning in the art. Thus, these terms are defined below as used in this description. It is deemed that these definitions provide a clearer understanding of the essence of the invention. Accordingly, one should not consider the invention limited thereby should the evolution of the art merely change the established meaning of the terms herein defined.

Cross correlation is the process of weighting one function with another function. It is represented by a mathematical operator where these two functions are inputs and the output is the integral (or summation) of their product for all possible relative shifts in their independent variable. Mathematically, the cross correlation between two input functions $f(x)$ and $g(x)$ is represented as:

$$R(y) = \int_{-\infty}^{\infty} f(x)g(x+y)dx$$

where $R(y)$ is the cross correlation, a function of the relative shift $y$. It is said that $f(x)$ is cross correlated with $g(x)$ or vice-versa. For example, a radar target signature may be transmitted through a delay line having a plurality of time spaced weighted taps. Cross correlation is performed between the radar target signature and the tap weight function since the weights together with the delay line perform a cross correlating operation with energy passing through the delay line.

The function cross correlating with the received energy may be set up by the weighted delay line described above. Radiant energy such as radar, sound, or optical energy can also be considered to comprise a cross correlating function since the energy in being back-scattered by a target is in essence cross correlating with the target. It is well known that a pulse of radiant energy cross correlates with a target to produce the target signature.

Autocorrelation is the cross correlation of a function with itself.

The cross correlation functions obtained from a target are derived or defined by the characteristics of the target. For example, a radar target signature is a cross correlation function of the target since it is derived from the characteristics of the target. In addition, the time inverted radar target signature is also a cross correlation function of the target.

The inverse target signature is the target signature, such as a radar target signature, inverted in time. The inverse target signature is a cross correlation function of the target.

The hyperplane weighting function is a function derived by hyperplane pattern recognition techniques which when cross correlated with a target signature produces a signal which is indicative of whether a desired target signature is present. The method of determining hyperplane weighting functions is well known to those skilled in the pattern recognition arts.

The inverse hyperplane weighting function is the time inverted hyperplane weighting function of a target.

BRIEF DESCRIPTION OF THE DRAWINGS

FIG. 7 shows a radar pulse intercepting a simplified target.

FIG. 8 shows the radar signature of the target of FIG. 7.

FIG. 9 shows the signature of FIG. 8 time inverted and intercepting the target of FIG. 7.

FIG. 10 illustrates the radar return suitable for target recognition.

FIG. 11 is a block diagram illustrating a portion of a coherent system built in accordance with the invention.

FIG. 12 illustrates a further portion of the coherent system of FIG. 11.

DESCRIPTION OF THE PREFERRED EMBODIMENT

Figure 1:
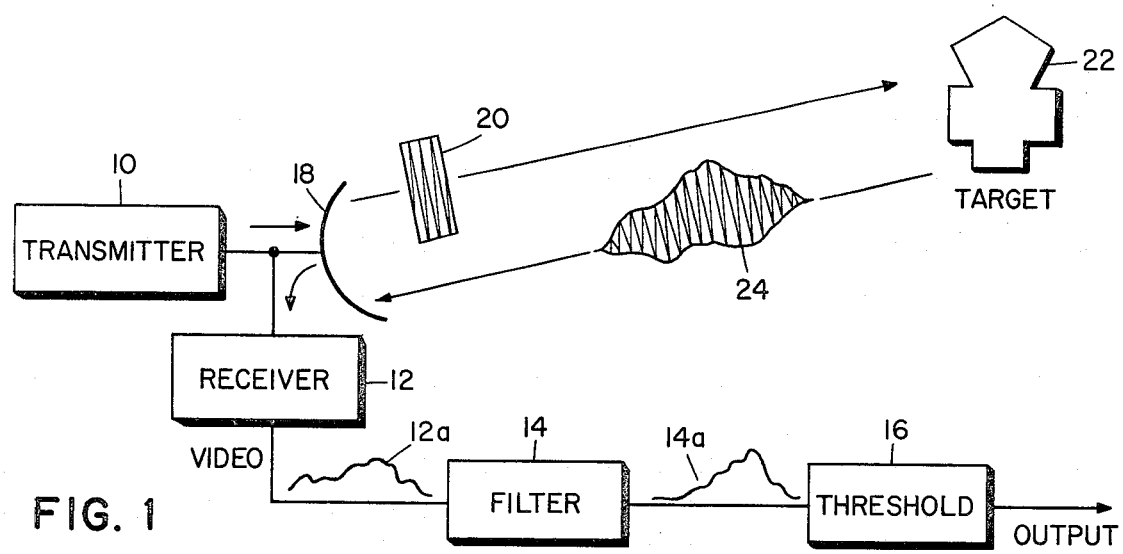
FIG. 1 is a block diagram of a conventional radar system.

Most radar systems are conceptually similar to the one shown in FIG. 1, reference to which should be made. The radar system is comprised of a transmitter 10, a receiver 12, a filter 14 and a threshold 16, together with an antenna 18. Transmitter 10 normally generates a short pulse 20 of high frequency waves which are radiated by antenna 18, for example, in the direction of a target 22. The pulse is scattered back by the target, the waveform of the back scattered energy being distinctive of the particular target and termed the target radar signature or simply the target signature. In essence, the pulse cross correlates with the target to produce the target signature. The target radar signature is represented by numeral 24. The back scattered target signature 24 is received at antenna 18 and processed by the receiver 12 to generate a video output generally preserving the distinctive shape of the target signature. This signature is now processed in a filter 14 which, for detection and range, is typically of the matched variety, where the filter's impulse response is made to be the time reverse of the transmitted wave shape. In other words, the filter 14 will generate a waveform having a distinctive peak which identifies the presence of a target imbedded in white noise. This peak is sensed by threshold 16 to generate an output which is indicative of the detection of a target. In the terms defined above, the target signature is a cross correlation function of the target. The filter also defines a target cross correlation function. If the target signature is of the same target whose cross correlation function set up by the filter, an autocorrelation is performed in the filter.

Figure 2:
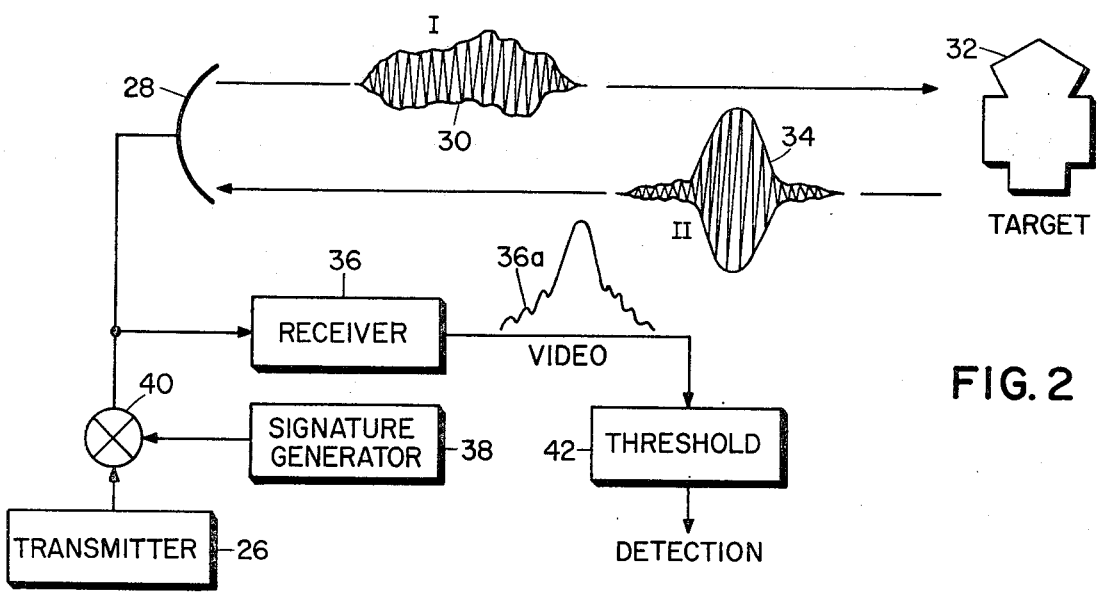
FIG. 2 is a simplified block diagram showing the invention applied to a radar system.

FIG. 2 shows a simplified block diagram of an inverse radar system, reference to which should now be made. In this figure, a signature generator 38 is capable of generating the inverse target signature of a desired target. A transmitter 26 generates a radar pulse. The time bandwidth product of the transmitter output pulse is changed in dispersive modulator means 40 in accordance with the inverse signature generated by signature generator 38. The output of dispersive modulator 40 will thus have an envelope which is the inverse signature of a desired target and will have the waveform generally indicated at 30 when radiated by antenna 28. If the waveform 30 now convolves with the desired target, for example target 32, that is, if the waveform 30 is back-scattered by the desired target, the back-scattered energy 34 will have a waveform of the same general shape as the autocorrelation function of the target signature. Signature autocorrelation functions are characterized by a symmetrical shape about a prominent peak. This return will be received in antenna 28 and processed by receiver 36. The video output of the receiver, video waveform 36a, will have a characteristically well defined maximum indicative of the fact that a desired target has been identified. As before, threshold 42 detects the presence of this well defined maximum. In the terms defined above, the desired inverse target signature is being back-scattered by a desired target and effects an autocorrelation with the desired target.

Of course, the dispersive modulator means 40 of FIG. 2 can be eliminated if transmitter 26 generates a CW radar signal. In this case, a balanced modulator is used to modulate the radar signal with the inverse target signature.

Figure 3:
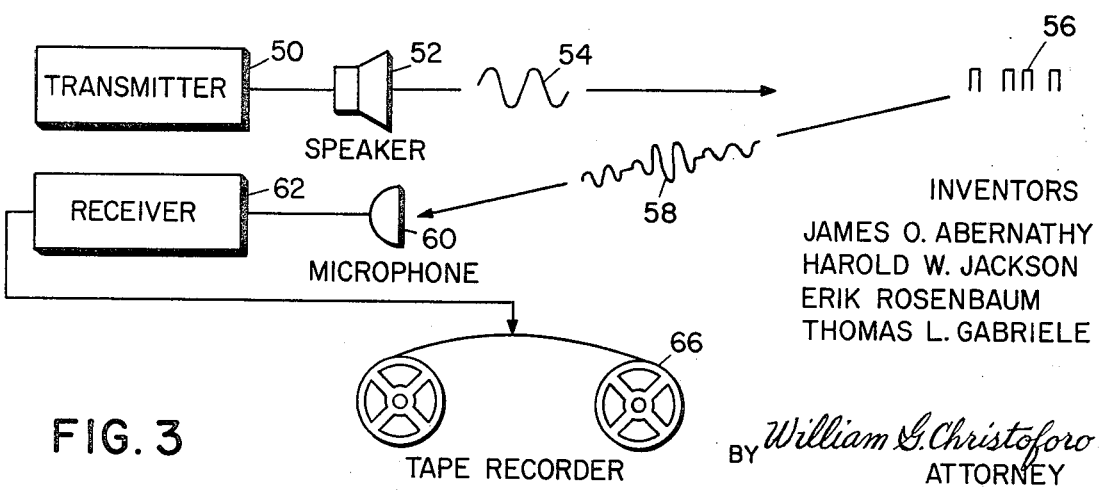
FIG. 3 is a block diagram of a sound radar system.

The principles described in the previous figures with respect to radar systems are applicable for other types of ranging and detecting systems. For example, the sound radar using sound waves in place of radar waves is known and a simplified block diagram thereof is shown in FIG. 3, reference to which should be made. In this figure a transmitter 50 generates a short burst of a pure audio tone which is radiated by speaker 52 and represented by radiating waveform 54. This waveform may be intercepted by a target, for example target 56 and back-scattered therefrom, the back-scattered energy being represented by waveform 58. As before, the back-scattered energy has a waveform which is typical of the target intercepted. This back-scattered energy is intercepted by microphone 60 and demodulated and amplified by receiver 62. The received waveform is also used for the detection and ranging of the target by means inherent in receiver 62. In addition, the received waveform is recorded by tape recorder 66 for use in the inverse sound radar to be described below.

Figure 4:
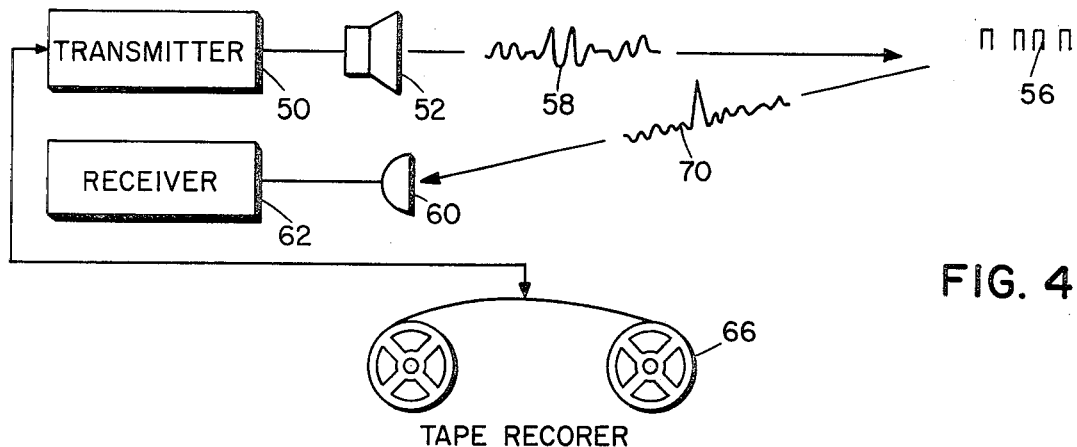
FIG. 4 shows the invention applied to a sound radar system.

This inverse sound radar is shown in simplified block diagram in FIG. 4 to which reference should now be made. In FIG. 4 the back-scattered signal earlier recorded by tape recorder 66 is played back and amplified by transmitter 50 and radiated by speaker 52 as the cross correlating function 58. This function autocorrelates with target 56 so that the back-scattered energy 70 includes the typical high peaked signal which is sensed by microphone 60 and processed by receiver 62.

Figure 5:
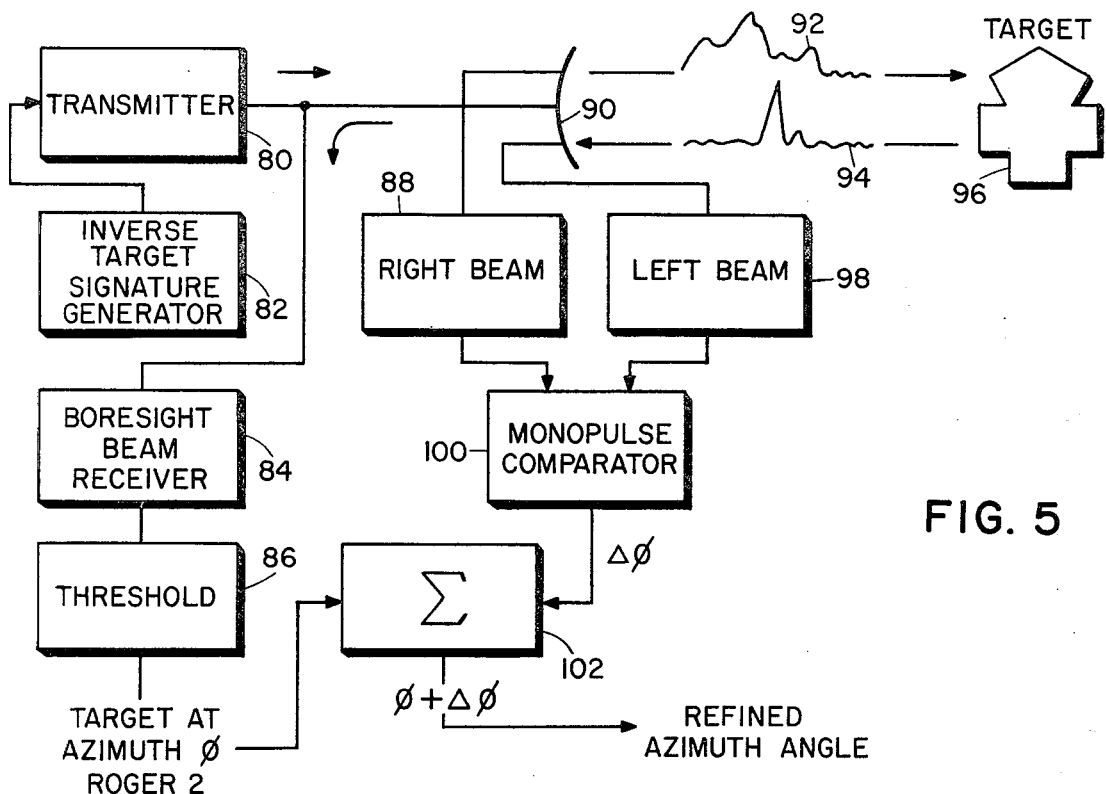
FIG. 5 shows the invention applied to a radar system having monopulse and recognition capabilities.

The inverse ranging and detecting concept when applied to a monopulse guided radar, for example, would enhance the signal to clutter ratio. In the normal monopulse guided radar short transmitted pulses can be used to provide high resolution thereby minimizing potential clutter producing areas and range uncertainty. However, the angular sensitivity is generally constrained by the limited space available for antenna aperature. Thus, if the radar determines through a recognition technique that a target is at a particular range, it still must refine its angular position estimate to achieve reasonable guidance accuracy. This is usually achieved by a monopulse unit which typically involves two squinted receiving beams. The system achieves increased angular accuracy by comparing the signal amplitude in the two beams and equating their ratio with the angular difference between the target and the intersection of the two squinted beams (i.e. boresight). In the conventional system, this is not necessarily the location of the desired target, since, if there are several significant reflectors in the beam, the system simply sums their returns and reads out their center of gravity. Refer now to FIG. 5 which shows a block diagram of an inverse radar with monopulse comparison and target recognition capability. The inverse radar system of FIG. 5 is identical to the conventional monopulse radar with target recognition capability except the latter radar system would have no inverse target signature generator 82 and the threshold detector 86 of FIG. 5 would be omitted and a pattern recognizer substituted therefor. In the inverse radar system of FIG. 5 the transmitter 80 output signal is modulated by the inverse cross-correlating function of the desired target by generator 82 so that the cross-correlating function 92 is radiated by antenna 90. The function 92 auto-correlates with the desired target 96 back-scattering the auto-correlation function 94 which is received by antenna 90. The boresight beam receiver 84 demodulates the received autocorrelation function which is detected by threshold 86 in the manner previously described. In addition, the right and left beams are received and demodulated by right and left beam receivers 88 and 98, respectively. The resultant demodulated autocorrelation functions are compared in comparator 100, the output of the comparator being a measure, $\Delta\phi$, of the desired target off antenna bore sight. $\Delta\phi$ is added to antenna azimuth $\phi$ in summer 102 to generate the refined target azimuth angle.

Figure 6:
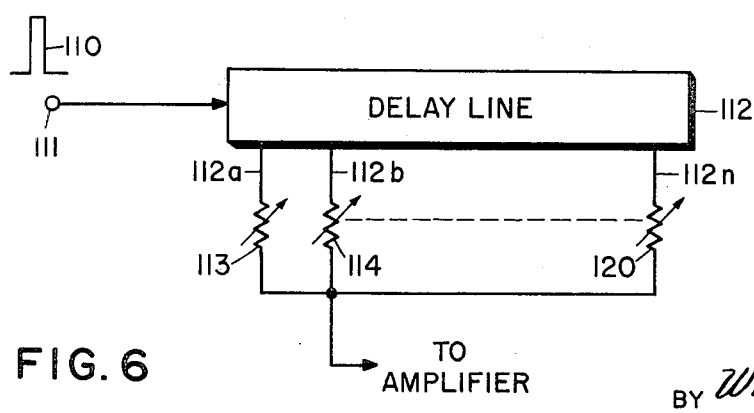
FIG. 6 shows a means of generating a time inverted radar signature.

One method of generating the inverse target signature for a sound radar is to simply record the target signature and then play the recorded signature backwards, as already explained. A specific means of storing and generating an inverse radar target signature is shown in FIG. 6, reference to which should now be made. In FIG. 6, a delay line 112 having an input terminal 111 has a plurality of time spaced taps 112a, 112b . . . 112n. Connected to the taps are adjustable weighting resistors 113, 114 . . . 120, respectively. The ends of each resistor are connected in common to the input of a radar amplifier of a transmitter. The weighting resistors are set in accordance with the inverse target signature of a desired target. This may be done by simply observing the back-scattered energy from a desired target illuminated by a short pulse of radar energy. This observation may be made by means of an oscilloscope on which is displayed the desired target signature. The amplitude at selected points on the desired target signature is determined and the weights set in accordance therewith in time reversed order. The time spacing of the delay line taps, in this case, should be the same as the time spacing of the points on the desired target signature at which the relative amplitudes are determined. Of course, the delay line should be of the same length as the desired target signature. When a radar pulse 110 is now impressed at the delay line input terminal 111, the resultant weighted delay output will closely approximate the inverse target signature.

It should also be obvious to those skilled in the art that the weighting resistors can be set in accordance with the inverse hyperplane weighting function.

Further types of inverse function generators should also now be apparent to one skilled in the art. For example, a sample and hold generator might be used in real time to store a cross correlation function of a target. The cross correlation function can then be transmitted to achieve further pattern recognition.

The weights of FIG. 6 might suitably be electronically controlled and set from punched cards, tapes or from a computer. In short, various means for obtaining, storing, time reversing or transmitting the cross correlation function of a desired target can be used in practicing the invention.

The description of the inverse ranging and detecting system so far has concerned itself with a non-coherent system. That is, no account has been made of the phase shifts which characterize the original target signature. The simplified representation shown in FIGS. 7 to 10, reference to which should now be made, is useful in explaining what is meant by non-coherent and in explaining the improvement in target recognition which can be expected from a coherent system.

In FIG. 7 there is seen a narrow radar pulse 134 moving in the direction of the arrow toward a simple idealized target comprised of reflectors 130 and 132 space $d$ apart. When pulse 134 strikes reflector 130 it is scattered as pulse 135 of FIG. 8. At the same time pulse 134 continues to move across $d$ to reflector 132 where it is reflected as pulse 137 of FIG. 8. At the time that pulse 137 has traveled across $d$ and reached the position of reflector 130, pulse 135 will have traveled $2d$ from reflector 130. The target signature of the target illuminated by narrow pulse 134 is thus that signature shown in FIG. 8.

Assuming that reflectors 130 and 132 are spaced a whole multiple of a half wavelength apart and referring to FIGS. 9 and 10 in particular, when the time inverted target signature 139 is now transmitted in the direction of the arrow toward the target, pulse 138 of the signature illuminates reflector 130 first and is back-scattered as pulse 142 of FIG. 10. Simultaneously, pulse 138 continues across space $d$ to illuminate reflector 132 and is back-scattered therefrom. When this last back-scattered pulse has traveled back to the position of reflector 130, its arrival at reflector 130 coincides with the first arrival of signature pulse 140 at that reflector. Pulse 140 is back-scattered, and since reflectors 130 and 132 are a whole multiple of a half wavelength apart, the pulse back-scattered from reflector 132 will be in phase with the pulse back-scattered from reflector 130 and hence these two back-scattered pulses will add to produce the higher amplitude pulse 144. Pulse 146 is, of course, produced by the back-scattering of pulse 140 by reflector 132. Detection of higher amplitude pulse 144 will result in recognition of the target, as should now be obvious.

It should now also be obvious that should reflectors 130 and 132 be a multiple of a quarter wavelength apart, the pulse back-scattered from reflector 132 by pulse 138 will arrive at reflector 130 out of phase with the pulse back-scattered from reflector 130 by pulse 140. Accordingly, pulse 144 will have zero amplitude for this simplified example and target recognition could not be accomplished. In an actual situation, however, a real target will be comprised of an extremely large number of reflector surfaces so that in most cases there will be sufficient adding of reflected pulses to provide a peak return for target recognition in the non-coherent system described.

A coherent system will allow further improved target recognition. For example, assume reflectors 130 and 132 are a whole multiple of a quarter wavelength apart. In the target signature of FIG. 8 pulse 137 will now be 90° out of phase with pulse 135. The inverse signature 139 will provide for this 90° phase shift if pulse 140 is 90° out of phase with pulse 138. The pulse back-scattered from reflector 132 by pulse 138 will now add to the pulse back-scattered from reflector 130 by pulse 140 to produce the higher amplitude pulse 144 required for target recognition.

The utility and implementation of a coherent system can be analyzed as follows. The target signature can be expressed mathematically as a function $f(t)$ where:

$$f(t) = A(t) \cos [wt+\theta(t)] \text{ for polar coordinates} \quad (1)$$

or $$f(t) = B(t) \cos wt + C(t) \sin wt \text{ for rectangular coordinates} \quad (2)$$

The target signature is, of course, to be time reversed for target recognition as explained above. Time reversing equation (2) produces:

$$f(-t) = B(-t) \cos wt - C(-t) \sin wt \quad (3)$$

Thus, where the target signature is represented mathematically by the sum of sine and cosine functions as in equation (2), the signature is time reversed by time reversing each function and changing the sign of the quadrature function. This sign change changes any phase leads to phase lags of the same magnitude and vice-versa. When this time reversed signature now illuminates the desired target, returns from all parts of the target will be in phase, as explained above, for correct summation to produce an enhanced peaked signal for target recognition.

The time reversal of the signature can be suitably accomplished through the use of even-odd series (Fourier and Walsh) representation. A block diagram of an implementation of a time reversal system appears in FIG. 11, reference to which should now be made. A radar receiver includes an antenna 160 which receives the signature back-scattered from a target when the target has been illuminated by a narrow pulse. The received signature is mixed in traveling wave tube 161 with a first local frequency applied at terminal 163. The output from traveling wave tube 161 is an intermediate frequency (IF) which is filtered by IF filter 165. The filtered IF is now mixed in mixer 170 with a second local frequency applied at terminal 168. The second local frequency is generally the same frequency as the IF. In addition, the second local frequency is shifted by 90° in phase shifter 172 and the resultant phase shifted frequency mixed in mixer 167 with the IF. The resultant quadrature base band signals are filtered by low pass filters 174 and 175, respectively to produce the detected quadrature components of the target signature. These components may now be suitably stored in sample and hold circuits 177 and 179, respectively.

In essence, the signal in each quadrature channel of the coherent system is processed similarly to the processing in the single channel shown in the non-coherent system. The remarks made in describing the non-coherent system with respect to signature recording and generation are applicable here.

To retransmit the time reversed target signature obtained by the system of FIG. 11 it is merely necessary to invert one component and reinsert the second local frequency into the time reversed contents of circuits 177 and 179 of FIG. 11, combine the resultant signals and used the combined signal to modulate the radar frequency. This is seen in FIG. 12, reference to which should be made. In this figure, the sample and hold circuits 177 and 179 of FIG. 11 are seen. The second local frequency at terminal 180 is reinserted into the time reversed contents of sample and hold circuit 177 by mixer 182 while the second local frequency shifted 90° by phase shifter 185 is reinserted into the time and sign reversed contents of sample and hold circuit 179. Sign reversing is performed by inverter 181. The resultant signals are added in adder 187 with the coherent time reversed target signature appearing at terminal 190 where it is available for modulation of a radar signal as previously described.

It should now be obvious to one skilled in this art that various other means for obtaining, storing, time reversing or transmitting the signals described herein can be used in practicing the invention. Accordingly, the invention is to be limited by the true scope and meaning of the appended claims.

The invention claimed is:

1. Means for identifying a target comprising:
   means for transmitting an inverse function of the signature of a desired target;
   means for receiving back-scattered energy; and,
   means for considering received back-scattered energy to determine whether the back-scattered energy is back-scattered from the desired target.

2. Means as recited in claim 1 wherein the inverse function is the inverse target signature of the desired target.

3. Means as recited in claim 1 wherein the inverse function is the inverse hyperplane weighting function of the desired target.

4. Means as recited in claim 1 wherein the inverse function is a function which autocorrelates with the desired target to back-scatter therefrom a readily recognizable and unique signature.

5. An inverse radar transmitter comprising:
   means for generating an inverse function of the radar signature of a desired target;
   means for generating an r.f. radar frequency
   means for modulating said r.f. radar frequency with said inverse function; and, means for radiating the modulated r.f. radar frequency into space.

6. The inverse radar transmitter of claim 5 with additionally utilization means for receiving back-scattered previously transmitted modulated r.f. radar frequencies.

7. The method of identifying a target comprising:
transmitting an inverse function of the target signature;
receiving the back-scattered inverse function of the target; and,
processing the received back-scattered inverse function.

8. The method of claim 7 wherein said processing step comprises comparing said received back-scattered inverse function against a known reference.

9. The method of claim 7 using radiant energy wherein the transmitting step comprises:
generating said radiant energy;
modulating said radiant energy to contain the inverse function of the target; and,
transmitting the modulated radiant energy into space.

10. The method of claim 7 wherein the inverse function of the target comprises the inverse hyperplane weighting function of the target.

11. The method of claim 7 wherein the inverse function of the target comprises the inverse target signature of the target.

* * * * *